United States Patent [19]

Sato et al.

[11] 4,363,268

[45] Dec. 14, 1982

[54] DRUM TYPE BAR CODE LINE PRINTER

[75] Inventors: Yo Sato, Tokyo; Tooru Shibayama, Sagamihara, both of Japan

[73] Assignee: Kabushiki Kaisha Sato, Japan

[21] Appl. No.: 169,750

[22] Filed: Jul. 17, 1980

[30] Foreign Application Priority Data

Jul. 19, 1979 [JP] Japan .................................. 54-90920

[51] Int. Cl.³ .............................................. B41J 5/00
[52] U.S. Cl. ..................................... 101/110; 400/157
[58] Field of Search ............................... 101/288–292, 101/110, 111, 93, 23; 400/157

[56] References Cited

U.S. PATENT DOCUMENTS

| | | | |
|---|---|---|---|
| 3,247,788 | 4/1966 | Wilkins et al. | 101/93.23 |
| 3,804,008 | 4/1974 | Hoyer | 400/157 |
| 4,094,244 | 6/1978 | Edwards et al. | 101/110 |
| 4,136,612 | 1/1979 | Dagnise | 101/110 |
| 4,189,997 | 2/1980 | Nozaki et al. | 101/93.23 |

FOREIGN PATENT DOCUMENTS 1101026  3/1961  Fed. Rep. of Germany ... 101/93.23

*Primary Examiner*—William Pieprz
*Attorney, Agent, or Firm*—Ostrolenk, Faber, Gerb & Soffen

[57] ABSTRACT

A drum type bar code line printer of the type has groups of predetermined kinds of bar code printing types which are arranged along the circumference of a printing drum in predetermined rows which are distributed along the axial direction of the drum. In each row, a non-printing (non-impact) area corresponding to the width of a bar code type is essentially formed adjacent to one end in the axial direction of the drum of each bar code type which has a black bar portion extending from said one end of the type through the predetermined modules of the type. The printer of the present invention is thereby free from the generation of so-called ghost images which are undesirably imprinted by adjacent bar code types.

11 Claims, 15 Drawing Figures

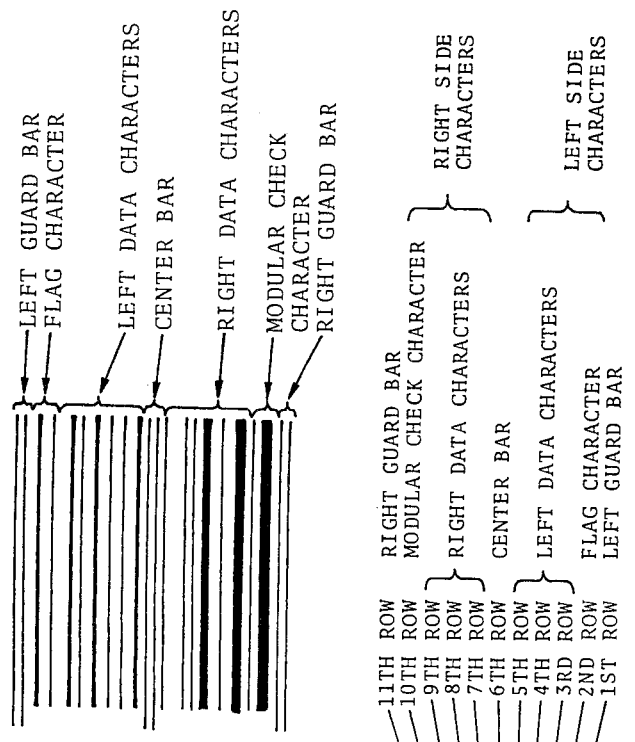
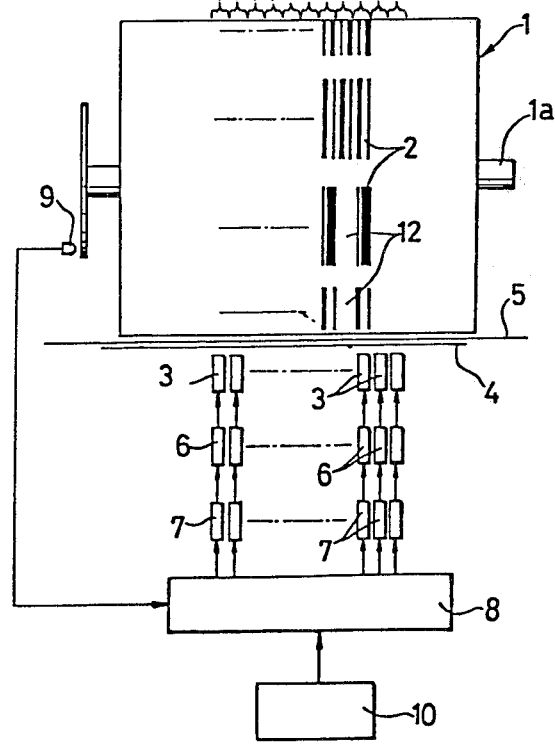
FIG.1
FIG.2

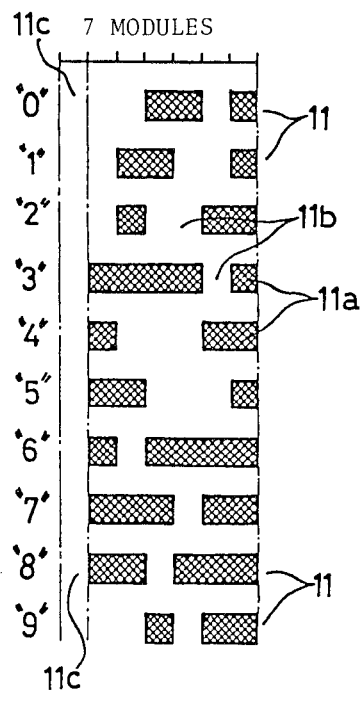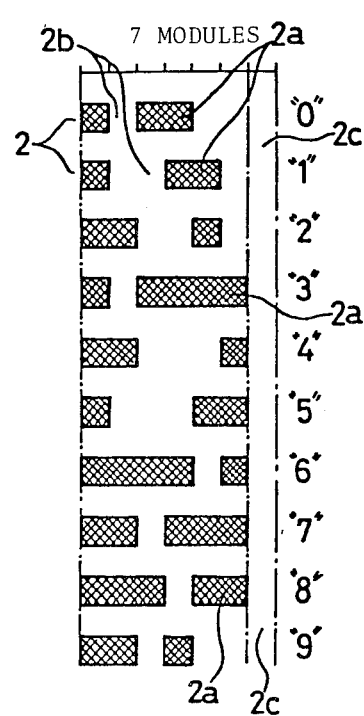

|  | 5TH ROW | 4TH ROW | 3RD ROW |
|---|---|---|---|
| 1ST LINE | 0 | 0 | 0 |
| 2ND LINE | 1 | 1 | 1 |
| 3RD LINE | 2 | 2 | 2 |
| 4TH LINE | 3 |  | 3 |
| 5TH LINE | 4 |  | 4 |
| 6TH LINE | 5 |  | 5 |
| 7TH LINE | 6 |  | 6 |
| 8TH LINE | 7 |  | 7 |
| 9TH LINE | 8 |  | 8 |
| 10TH LINE | 9 | 3 |  |
| 11TH LINE |  | 4 |  |
| 12TH LINE |  | 5 |  |
| 13TH LINE |  | 6 |  |
| 14TH LINE |  | 7 |  |
| 15TH LINE |  | 8 |  |
| 16TH LINE |  | 9 | 9 |

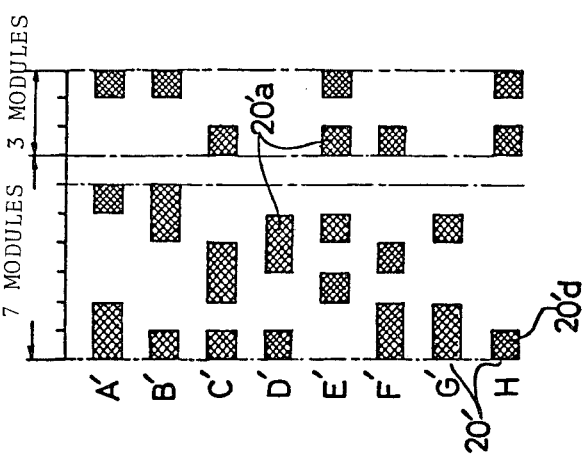

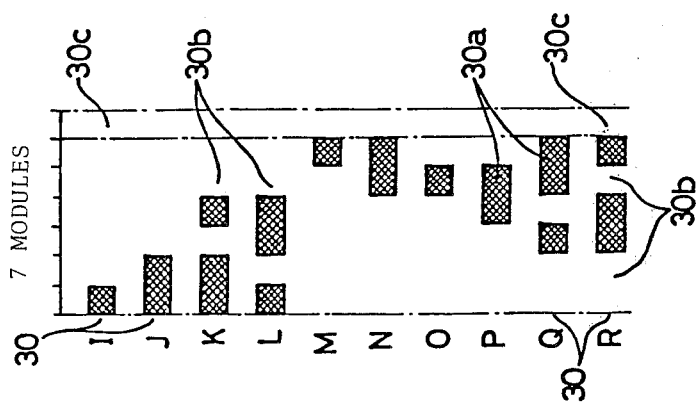

FIG.15

|  | 5TH ROW | 4TH ROW | 3RD ROW |
|---|---|---|---|
| 1ST LINE |  | K | M |
| 2ND LINE | O | Q |  |
| 3RD LINE | R |  | L |
| 4TH LINE 31 |  | I | N |
| 5TH LINE | M |  | J |
| 6TH LINE | L | O | P |
| 7TH LINE | N |  | K |
| 8TH LINE 31 | J | R |  |
| 9TH LINE | P | M |  |
| 10TH LINE |  | L | Q |
| 11TH LINE | K | N |  |
| 12TH LINE | Q |  | I |
| 13TH LINE |  | J | O |
| 14TH LINE | I | P | R |

FIG.14

|  | 5TH ROW | 4TH ROW | 3RD ROW |
|---|---|---|---|
| 1ST LINE | R |  | O |
| 2ND LINE | I | R |  |
| 3RD LINE |  | I | R |
| 4TH LINE | Q |  | I |
| 5TH LINE | K | Q |  |
| 6TH LINE | P | K | Q |
| 7TH LINE | J | P | K |
| 8TH LINE |  | J | P |
| 9TH LINE | N |  | J |
| 10TH LINE | L | N |  |
| 11TH LINE |  | L | N |
| 12TH LINE | M |  | L |
| 13TH LINE | O | M |  |
| 14TH LINE |  | O | M |

DRUM TYPE BAR CODE LINE PRINTER

BACKGROUND OF THE INVENTION

This invention relates to a drum type line printer for printing bar codes. More particularly, the invention relates to a drum type line printer which prevents the occurrence of so-called ghost images that are generated by adjacent types during printing strokes against the bar code types by their respective hammers. The ghost images are undesirable black bar impressions that are printed where they should not be.

The need for bar code printers has recently increased due to the recent adoption of the POS (point-of-sale) system and the batch treatment system.

For example, the bar code shown in FIG. 1 of the drawings hereof is employed in such systems. This bar code is an instance of a shortened version of a bar code and comprises a plurality of parallel black bar portions and a plurality of white bar portions. The illustrated bar code comprises, in sequence from the left, a left guard bar unit, a left side character unit consisting of four characters including a flag character, a center bar unit, a right side character unit consisting of four characters including a modular check character, and a right guard bar unit. Each of the guard bar units comprises three modules. The center bar unit comprises five modules. Each character unit comprises seven modules. The module at the left end of the left side data character unit and the module at the right end of the right side data character unit are always white bar portions.

In printing such bar codes with a drum type line printer, it is common and effective to align a respective printing hammer with each guard bar row, each center bar row and each character row. The rows are arranged around the circumference of the printing drum. Thus, in order to print these bar codes in practice, a module in white line form is formed as a pseudospace between each character axially along the drum, and this spaces apart the axially arranged rows of the respective bar code types.

However, since the printing is performed such that each pseudospace between the characters in a line is the width of one module of a multi-module bar code character, the spaces between the rows of types are very small. Therefore, when one type is printed by a printing hammer, the material to be printed, such as paper or a label sheet, often contacts the adjacent types through the carbon ribbon. Thus, ghost images are often generated by the black line printing portions or modules of adjacent types. As a result, the printing information or bar code on the material to be printed may be erroneously read by an automated optical character reader.

The foregoing problem arises with the printing of all bar codes, except those in which a considerable space is left between adjacent characters in a line.

SUMMARY OF THE INVENTION

It is, therefore, the object of the present invention to provide a drum type bar code line printer which is so constructed that ghost images which may be caused by adjacent bar code types are eliminated during printing with printing hammers.

It is another object of the present invention to provide the foregoing drum type bar code line printer having a structure that is neither complicated nor changed largely from conventional ones.

In accordance with the present invention, groups of predetermined kinds of bar code types are arranged along the circumference of a printing drum in predetermined rows which are distributed along the axial direction of the drum. Further, in each circumferential row, a non-imprinting area corresponding to the width of a bar code type is formed adjacent to one end of each of the bar code types in that row which has a black bar portion that extends from said one end of the type through the predetermined modules of that type.

Other objects and features of the invention will be apparent from the following description and accompanying drawings.

DESCRIPTION OF THE DRAWINGS

FIG. 1 is a plan view of an example of a bar code:

FIG. 2 is a schematic illustration of the entire bar code line printer in accordance with the present invention;

FIG. 3 is an explanatory drawing which shows unit bar codes corresponding to the bar codes shown in FIG. 1 and it indicates the relative widths of black bar portions and white bar portions;

FIGS. 4 and 5 show the first embodiment of the present invention, in which:

FIG. 4 shows the bar code types for printing each unit bar code and the relative widths of the black bar portions and white bar portions; and FIG. 5 is a diagram showing the position of each bar code type of FIG. 4 on a printing drum;

FIGS. 6 to 11 show the second embodiment of the present invention; in which:

FIGS. 6 and 9 are drawings showing bar code element types for printing unit bar codes and the relative widths of black bar portions and white bar portions;

FIGS. 7 and 10 are diagrams showing the relationship between unit bar codes and bar code element types; and FIGS. 8 and 11 are diagrams showing the position of each bar code element type formed on the printing drum; and FIGS. 12 to 15 show the third embodiment of the present invention; in which:

FIG. 12 is a drawing of the third embodiment which corresponds to the above FIG. 6;

FIG. 13 is a diagram of the third embodiment which corresponds to the above FIG. 7; and FIGS. 14 and 15 are diagrams of the third embodiment which corresponds to the above FIG. 8.

DESCRIPTION OF THE INVENTION

Figures 5, 6:
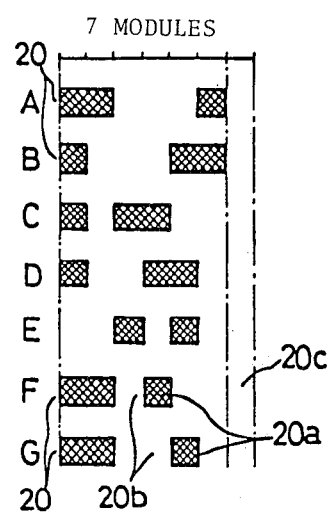

Embodiments of the present invention will now be described with reference to the accompanying drawings.

The first embodiment will be described with reference to a drum type bar code line printer for printing bar codes of the type shown in FIG. 1.

Referring to FIG. 2, there is a printing drum 1, which rotates along with a rotational driving shaft 1a. On the outer circumference of the printing drum 1 are formed bar code types 2 for printing unit bar codes of characters, guard bars and center bars. The bar code types 2 are arranged on the outer circumference of the drum and are distributed along its axial direction. Among these bar code types 2, those for printing the left guard bar unit in FIG. 1 are arranged in the first row at the right end of the printing drum 1 in FIG. 2. There are a predetermined number of the types in this row and these types are arranged around the circumference of the drum. In the second to eleventh rows, the bar code types 2 are arranged in the required number around the circumference of the drum in the order of a flag character, a left side data character unit with three rows, a center bar, a right side data character unit with three rows, a modular check character and a right guard bar. Since the left guard bar unit, the flag character, the center bar unit and the right guard bar unit are generally not varied, at least one bar code type 2 for printing each of them may sufficiently be formed in the respective rows.

Each hammer 3 is arranged in a position opposed to the surface of the printing drum 1 in the axial position corresponding to a respective type row. Between these printing hammers 3 and the printing drum 1 is conventionally movably disposed a material 4 to be printed such as printing paper or a label strip. A carbon ribbon 5 is movably interposed between the material to be printed 4 and the printing drum 1.

A magnet 6 is provided for driving each printing hammer 3, and each magnet 6 is excited by a respective hammer driving circuit 7. There is a data processing circuit 8 for controlling each printing hammer driving circuit 7 based on an imput signal from a sensor 9 which detects the rotational position of the printing drum 1 and based on the desired imprint information from an external device 10.

FIG. 3 shows printed unit bar codes 11 corresponding to the numbers "0" to "9" of the left data character. Each unit bar code 11 is comprised of seven modules combined in black bars 11a and white bars 11b. The module at the left end is always a white bar 11b. This white module bar 11b at the left end of the unit bar code will be called a pseudospace module 11c here. In the unit bar codes 11 shown in FIG. 3, as well as in the bar code types shown in FIGS. 4, 6, 9 and 12, the longitudinal length circumferentially of the drum (which is in the vertical direction in each Figure) is shown in a reduced scale with respect to the transverse direction longitudinally of the drum (which is in the horizontal direction in each Figure).

FIG. 4 shows the bar code types 2 for printing each unit bar code 2 of "0" to "9" shown in FIG. 3. One of these ten kinds of the bar code types 2 is formed at the third, fourth and fifth rows of the outer circumference of the printing drum 1, and each of them comprises a protruding black bar portion 2a for printing the black bar 11a and a recessed white bar portion 2b corresponding to the white bar 11b. Among these white bar portions 2b, the part corresponding to the pseudospace module 11c will be called a pseudospace 2c. The pattern of the bar codes and the axial arrangement of the bar code types 2 on the printing drum 1 are mirror images of each other. This is because the carbon ribbon is interposed between the printing drum 1 and the material to be printed 4, and the material to be printed 4 is struck by each printing hammer 3 for printing the bar code.

The positions of the three circumferential rows of bar code types 2 on the printing drum 1, in the third to fifth rows, are shown in FIG. 5.

Each row is divided into 16 lines. In the third to fifth rows, the bar code types 2 are disposed for printing unit bar codes 11 from "0" to "9" in ten predetermined lines. More specifically, in the bar code types 2 corresponding to "3"–"8", the module at the right end, excepting the pseudospace 2c, is a black bar portion 2a. Therefore, the ten lines of bar codes are arranged over the sixteen available lines so that the area adjacent to the right end and equal in size to one bar code area is left as a non-printing portion 12.

In this non-printing portion 12, no imprintable information is formed, that is, this part comprises a recessed part on the outer circumference of the printing drum 1, just like the white bar portion 2b. Thus, the area adjacent to the right of these bar code types 2 corresponding to "3"–"8" shown in FIG. 4 is not printed. Those types include black bar portions 2a that extend over to the pseudospace 12. As a result, a ghost image will not be printed by the black bar portion 2a at the right end of the bar code types 2 corresponding to "3"–"8".

In the bar code types 2 corresponding to "0", "1", "2", and "9", there are white bar portions 2b corresponding to at least one module included between the black bar portions 2a and the bar code types 2 adjacent to them to their right. Thus, it is improbable that a ghost image would be caused when the adjacent bar code type 2 to the right is printed.

In the area which is immediately to the left of each bar code type 2 and which corresponds to a bar code type area, a special non-printing (non-impact) part 12 need not be formed. In the first embodiment of the present invention, each unit bar code 11 corresponding to "0" through "9" shown in FIG. 3 is, in each case, arranged such that its right end module is a black bar portion 11a. In other words, in printing, even when a ghost image is caused by the adjacent bar code type 2 at its left in FIGS. 4 and 5, the result is that the edge on the left end of the black bar portion 2a is dimly printed, which part is ultimately to be printed as the black bar portion 11a.

In the above embodiment, for the sake of brevity and simplicity, the description has been made only with respect to the bar code types 2 for printing the three rows of the left side data character unit, and their positions relative to the printing drum 1. However, also in the case of the right side data character unit, the seventh to ninth rows of the printing drum are similarly formed so as to form non-printing areas at predetermined bar code characters. These non-printing areas may also be formed in the flag characters or modular check characters.

The operation of the drum type bar code line printer of the above type will now be described.

The printing drum 1 is constantly rotated by a motor (not shown) in a predetermined direction with the rotational driving shaft 1a. A data processing circuit 8 responds to an input signal from a sensor 9 that detects the rotational position of the printing drum 1 and judges which bar code type 2 of each row of the printing drum 1 is to be printed in response to the printing information supplied from the external device 10.

Immediately before the bar code type 2 which is to be printed reaches the printing position opposite the printing hammer 3 in each row, the appropriate hammer driving circuit 7 is individually controlled by the data processing circuit 8 and excites a corresponding magnet 6. When the excited magnet acts on its respective printing hammer 3, the printing hammer 3 strikes through the material to be printed 4 and the carbon ribbon 5 upon the bar code type 2 on the corresponding row. Consequently, the bar code shown in FIG. 1 is printed on the material 4 to be printed in a predetermined position.

Since each bar code type 2 is formed as shown in FIG. 5, and since the non-printing part 12 corresponds to the width of each bar code type 2 in its necessary position, ghost images caused by printing a part of the black bar portion 2a of the adjacent bar code type 2 are eliminated.

The second embodiment of the present invention will now be described referring to FIGS. 6 to 8.

FIG. 6 shows examples of patterns for bar code element types 20 in accordance with this embodiment, and illustrates the construction of the seven bar code element types 20 for printing the left side data character unit that is shown in FIG. 3. These bar code element types 20 shown as A-G, are formed on the third to the fifth rows of the outer circumference of the printing drum 1 shown in FIG. 2. They each comprise combinations of protruding black bar portions 20a and recessed white bar portions 20b. Among the white bar portions 20b, the one that corresponds to the pseudospace module 11c will be referred to as a pseudospace 20c, as in the first embodiment.

In the example shown in FIG. 6, the black bar portion 20a of each bar code element type 20 shown as A-G comprises two or three modules so that a small printing force is sufficient to obtain clear printing. The total area of the black bar portion 20a of each bar code element type 20 differs by at most one module and, therefore, the printing pressure per unit area of the printing hammer 3 is not widely varied.

By using merely one or combining a plurality of bar code element types 20, a desired bar code 11 can be printed corresponding to numerals "0"-"9", as shown in FIG. 3. More specifically, as shown in FIG. 7, "0" is printed by striking "C" of the bar code element types 20 alone, and "3" is printed by striking the B and C of the bar code element types 20 in combination, i.e. the hammer first strikes B and thereafter strikes C at the same location on the imprintable medium paper.

The positions of the bar code element types 20 that are formed on the printing drum 1 are shown in FIG. 8. Each row is divided into nine lines and is provided with seven kinds of bar code element types 20, shown as A-G, in predetermined seven lines out of nine lines. In the bar code element types 20 shown as A and B in FIG. 6, the module at the right end, excepting the pseudospace 20c, is a black bar portion 20a. Thus, in FIG. 8, the area adjacent to this right end is a non-printing part 21 which corresponds to the width of one bar code element type 20. The area adjacent to the right side of the bar code element types 20 shown as A and B are not printed. Consequently, a ghost image is not caused by the black bar portions 20a at the right end of the bar code element types 20 shown as A and B.

In the arrangement of the bar code element types 20 shown in FIG. 8, the bar code element types 20 which may be typed in combination, such as B and C or A and E, are arranged within a row and are spaced apart from each other circumferentially by areas corresponding to at least two bar code element types 20. Due to this construction, when a pair of bar code element types 20 need to be printed at one location on a sheet of paper during one rotation of the printing drum 1, this may be accomplished without requiring a printing hammer that operates with extremely high speed.

The same construction can be applied to the bar code element types for printing the right side data character unit.

The operation and construction of the entire device is the same as in the first embodiment shown in FIG. 2. However, the data processing circuit 8 must be able to judge the combination of bar code element types 20 in each row, that is, to judge the content shown in FIG. 8. Such a circuit will not be described here since it is merely a matter of design.

In a special application of the bar codes in marking in a store, the flag character is not used and all of the four left side characters are used as data characters. In this case, in the second row of the printing drum 1, the unit bar codes 11 corresponding to "0" and "9" must also be printed as in the third, fourth, and fifth rows.

Since the information in the left guard bar unit is always the same, it is preferable to simplify the mechanism and circuit to print, with a single printing hammer, the left guard bar unit arranged in the first row and the data character unit arranged in the second row.

FIGS. 9-11 show a modified example of the second embodiment in consideration of this.

The pattern of the bar code type shown in FIG. 9 is formed covering the first and second rows. The three modules at the right of the Figure corresponds to the left guard bar unit, and the seven remaining modules corresponds to the data character unit. In the left guard bar unit, the first and the third modules are black bars and the second module is a white bar.

Those bar code element types 20' shown by A'-G' which correspond to the data characters are patterned like the bar code element types 20 shown in FIG. 6. Those which correspond to the left guard bar are in the form of elements and are added to the part corresponding to the data character unit so as to lessen the area of the black bar portions 20'a of each bar code element type 20' and to allow uniform printing.

The bar code element type 20' shown as H is printed so as to compensate for the shortage of the black bar portion 20'a of the left guard bar unit when only one of the bar code element types 20' of A', B', C', D' and F' is printed. Numeral 20'd denotes a black bar portion which is formed so as to keep the hammer printing pressure balanced at the right and left sides and to keep the printing areas of the bar code element types 20' approximately equal when printing the bar code element types 20' as shown by H. This, therefore, does not have any significance as information. In this modified example of the second embodiment, bar code element types 20 as shown in FIG. 6 are formed in the third to fifth rows of the printing drum 1. Shown in FIG. 10 are the combinations for printing the numerals "0"-"9" and the left guard bar unit using the bar code element types 20' in FIG. 9. The position of each of the bar code element types 20 and 20' formed on the outer circumference of the printing drum 1 is shown in FIG. 11.

The third embodiment of the present invention will now be described referring to FIGS. 12-14.

FIG. 12 shows examples of bar code types in accordance with the third embodiment, and shows the construction of each of the ten bar code element types 30 for printing the left side data character unit, as shown in FIG. 3. These bar code types 30 are formed in the third through fifth rows of the outer circumference of the printing drum 1 shown in FIG. 1, and comprise a combination of protruding black bar portions 30a and recessed white bar portions 30b.

The above-mentioned bar code element types 30 are divided into a first kind which are designated by the symbols I-L, and a second kind which are designated by the symbols N-R. Each of the first kind of bar code element types 30 has a white bar position 30b corresponding to the width of two modules or more at the right end adjacent to a pseudospace 30c. Each of the second kind of bar code element types 30 has a white bar portion 30b equal to two modules or more on its left end.

The bar code element types 30 of the first and second kinds are struck, as in the case of the above-mentioned second embodiment, either alone or in combination so as to print the desired bar code 11 corresponding to "0"–"9" shown in FIG. 3. For example, as shown in FIG. 13, "0" can be printed by striking the L bar code element type 30 alone, and "1" can be printed by striking the I and P bar code element types 30 in combination.

The positions of the bar code element types 30 of this construction on the printing drum 1 are shown in FIG. 14. Each row is divided into 14 lines. Each row is provided with ten bar code element types shown as I–R in ten predetermined lines.

In the bar code element types 30 of the second kind that are shown by M, N, Q and R, each of them is provided with a black bar portion 30a at its right end, excepting the pseudospace 30c which is one module in width. Therefore, the area adjacent to the right side of these types are left as non-printing portions 31 having the width of a bar code element type 30. Thus, since there is a non-printing area corresponding to one bar code element type width adjacent to the right side of each of the bar code element types 30 shown as M, N, Q and R, ghost images will not be caused by erroneous printing of the black bar portion 30a on the right side of these bar code elements types 30 shown as M, N, Q and R.

The bar code element types for printing the right side data character unit and so on can be constructed similarly. Since the construction and operation of the entire device is the same as in the case of the second embodiment, no further description is provided.

FIG. 15 shows a modified example of the second embodiment shown in FIG. 14, which modifies the positions of the bar code element types 30 on the printing drum 1. In this example, a non-printing portion 31 equal in width to one bar code element type 30 is formed both at the area adjacent to the left side of each bar code element type 30 of I, J, K and L and at the area adjacent to the right side of each bar code element type 30 of M, N, Q and R of FIG. 12.

When the bar code element types 30 are formed in this arrangement, no part of the bar code element types 30 adjacent to either the right or left side will be erroneously printed, regardless of the pattern of each unit bar code type 30. In another case, when printing a plurality of different unit bar codes 11 (not shown), at least one of which has a black bar 11b at its left end, excepting the pseudospace module 11c, and at least one of which has a white bar 11b at its right end, a ghost image may be caused at the right end, unlike the situation of FIG. 3. In this case, each bar code element type 30 needs to be constructed as shown in FIG. 15.

In any arrangements of bar code element types 30 shown in FIGS. 14 and 15, as in the case of the second embodiment, bar code types 30 which may be printed in combination are arranged in a single row and are circumferentially spaced apart from one another by at least two bar code element types 30.

In each of the above embodiments, the unit bar codes 11 are separated by a part called the pseudospace 11c formed at one end of each unit bar code 11. However, it is to be understood that the device of the present invention can be also applied to unit bar codes which have actual spaces between them which are not treated as data.

Further, the description has been made with respect to the case wherein the carbon ribbon 5 is interposed between the printing drum 1 and the material to be printed 4. However, it is to be understood that this carbon ribbon 5 may be interposed between the printing hammer 3 and the material to be printed 4. In this case, the pattern of each bar code type and the position of each bar code type on the printing drum 1 may be reversed in relation to the positions and patterns described in the embodiments of the present invention.

In summary, in the present invention, a predetermined number of kinds of bar code types are formed in predetermined rows on the outer circumference of a printing drum and a non-printing part, corresponding in area to the space of one bar code type, is formed at least at one side of each bar code type. Therefore, erroneous printing of black bars in the areas at which printing is undesirable is not caused by adjacent bar code types.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A drum type bar code printer, comprising:
   a drum which is rotatable about the axis thereof;
   imprintable bar code types arranged in circumferential rows around the drum; the rows being arrayed along the axial direction of the drum; the drum having a plurality of axial lines, and the bar code types in all of the rows being arrayed on respective ones of the lines;
   each bar code type having opposite ends along the axial direction of the drum; each bar code type being comprised of a plurality of modules in series along the axial direction of the drum; each bar code type being comprised of an imprintable black bar portion occupying a first respective plurality of the modules of that type and a non-printable portion occupying a second respective plurality of the modules of that type, with these black bar and non-printable portions of each bar code type being arranged next to each other along the axial direction of the drum;
   the bar code types in any of the lines thereof being arranged so that a non-imprintable area is defined, between two of the bar code types, the area essentially corresponding in width along the axial direction of the drum to a first predetermined number of modules of a bar code type, and the area being adjacent to that end of each of the bar code types in that line where any of the first plurality of modules is within a second predetermined number of modules from that end of that type.

2. The drum type bar code printer of claim 1, wherein at least some of the first plurality of modules in a row thereof are adapted for being imprinted in combination at the same location on an imprintable surface, such that the totality of the plurality of imprints of the first plurality of modules is adapted for being imprinted in combination to define a single bar code type.

3. The drum type bar code printer of either of claims 1 or 2, wherein some of the bar code types include a white bar portion in the second plurality of modules, as well as the black bar portion as the first plurality of modules; the types with the white bar portion have that portion located at the modules near one of the ends of that type and extending toward the other end of that type.

4. The drum type bar code printer of claim 3, wherein some of the white bar portion second modules are at one axial end of their respective types, and the others of the white bar portion second modules are at the opposite axial end of the other respective types.

5. The drum type bar code printer of either of claims 1 or 2, wherein there are more lines of bar code types on the drum than there are bar code types in each of the rows thereof.

6. The drum type bar code printer of claim 1, further comprising means for rotating the drum around the axis thereof.

7. The drum type bar code printer of either of claims 1 or 6, further comprising individual impact means for impacting an imprintable object against the bar code type then located in the path of the impact means and the impact means is sized to impact only that bar code type; and means for selectively causing each impact means to impact the type then in the path of that impact means.

8. The drum type bar code printer of claim 1, wherein the non-imprintable area corresponds in width essentially to the width of a bar code type.

9. The drum type bar code printer of claim 8, wherein each non-imprintable area is in a row including other bar code types and all of the types are in respective rows.

10. The drum type bar code printer of claim 1, wherein a non-imprintable area is defined adjacent to the end of a type where any of the first plurality of modules is within two modules of that end of that type.

11. The drum type bar code printer of claim 5, wherein there are no bar code types on respective ones of the rows in all of the lines.

* * * * *